(12) United States Patent
Naiki (10) Patent No.: US 12,066,531 B2
(45) Date of Patent: Aug. 20, 2024

(54) ULTRASONIC SENSOR CONTROL DEVICE AND ULTRASONIC SENSOR

(71) Applicant: ROHM Co., LTD., Kyoto (JP)

(72) Inventor: Takashi Naiki, Kyoto (JP)

(73) Assignee: ROHM Co., LTD., Kyoto (JP)

( * ) Notice: Subject to any disclaimer, the term of this patent is extended or adjusted under 35 U.S.C. 154(b) by 148 days.

(21) Appl. No.: 17/933,977

(22) Filed: Sep. 21, 2022

(65) Prior Publication Data

US 2023/0112938 A1 Apr. 13, 2023

(30) Foreign Application Priority Data

Oct. 7, 2021 (JP) ................. 2021-165532

(51) Int. Cl.
*G01S 15/08* (2006.01)

(52) U.S. Cl.
CPC ................... *G01S 15/08* (2013.01)

(58) Field of Classification Search
CPC ........ G01S 15/08; G01S 15/42; G01S 15/102; G01S 15/10; G01S 15/18; G01S 15/14; G01S 15/12; G01S 15/32; G01S 15/06; G01S 15/50; G01S 15/58; G01S 15/60; G01S 15/46; G01S 15/34; G01S 15/36; G01S 15/02; G01S 15/003; G01S 15/00; G01S 13/00; G01S 13/003; G01S 1/02; G01S 1/022; G01S 1/70; G01S 5/00; G01S 3/00; G01S 17/003; G01S 17/00; G01S 17/88; G01S 19/38; G01S 7/524; G01S 7/5345; G01S 7/536; G01S 7/00; G01S 7/003; G01S 7/02; G01S 7/48; G01S 1/00; G01S 15/107; G01S 19/01; G01S 19/00; G06F 9/30189; G06F 9/542; G06F 11/00; G06F 1/02; G06F 1/03; G06F 17/10; G06F 17/40; H04L 67/12; H04L 67/568; H04W 4/70

See application file for complete search history.

(56) References Cited

U.S. PATENT DOCUMENTS

| 2018/0252796 A1* | 9/2018 | Qu ........................... G01S 5/26 |
| 2018/0323783 A1* | 11/2018 | Bang ...................... G01S 15/88 |
| 2020/0213971 A1* | 7/2020 | Ayyalasomayajula ...................... H04W 4/029 |

FOREIGN PATENT DOCUMENTS

JP 2017-156281 9/2017

* cited by examiner

*Primary Examiner* — Daniel L Murphy
*Assistant Examiner* — Aime M Ndure
(74) *Attorney, Agent, or Firm* — CHIP LAW GROUP (57) ABSTRACT

Disclosed herein is an ultrasonic sensor control device that controls an ultrasonic sensor device configured to transmit and receive ultrasonic waves. The ultrasonic sensor control device includes a transmission control section configured to control transmission of a transmission ultrasonic wave at a first frequency through the ultrasonic sensor device, a reception section configured to receive a reception ultrasonic wave through the ultrasonic sensor device, and a device control section configured to control the ultrasonic sensor device to set given frequencies as a transmission frequency of the transmission ultrasonic wave and a reception frequency of the reception ultrasonic wave. The device control section changes the reception frequency in such a manner that the reception frequency is a frequency different from the first frequency during a first period including at least a transmission period during which the transmission ultrasonic wave is transmitted.

6 Claims, 8 Drawing Sheets

|  | FREQUENCY [kHz] | CONTROL VOLTAGE [V] | DISTANCE-MEASURING FREQUENCY |
|---|---|---|---|
| FIRST FREQUENCY | 40 | 0 | ○ |
| SECOND FREQUENCY | 45 | 3 |  |
| THIRD FREQUENCY | 50 | 6 |  |

FIG.3B

| TRANSMISSION INFORMATION | TRANSMISSION STATUS | TRANSMITTING |
| --- | --- | --- |
| | TRANSMISSION FREQUENCY | FIRST FREQUENCY |
| RECEPTION INFORMATION | RECEPTION STATUS | NO RECEPTION |
| | RECEPTION FREQUENCY | SECOND FREQUENCY |

ULTRASONIC SENSOR CONTROL DEVICE AND ULTRASONIC SENSOR

CROSS REFERENCE TO RELATED APPLICATIONS

This application claims priority benefit of Japanese Patent Application No. JP 2021-165532 filed in the Japan Patent Office on Oct. 7, 2021. Each of the above-referenced applications is hereby incorporated herein by reference in its entirety.

BACKGROUND

The present disclosure relates to an ultrasonic sensor control device and an ultrasonic sensor.

Ultrasonic systems are known which measure the distance to a target object by causing an ultrasonic wave to be transmitted and measuring a time until a return of the wave reflected from the target object. In addition, a method for reducing influence of a direct wave from a transmitter of the ultrasonic wave has been proposed for such an ultrasonic system. Japanese Patent Laid-open No. 2017-156281 (hereinafter referred to as Patent Document 1) discloses an ultrasonic sensor device including an ultrasonic transmitter that transmits ultrasonic waves and an ultrasonic receiver that receives ultrasonic waves. In the ultrasonic sensor device disclosed in Patent Document 1, influence of reverberations of a direct wave is reduced using a signal representing a threshold value of the sound pressure of ultrasonic waves and a mask signal representing a mask period.

SUMMARY

However, in the ultrasonic sensor device disclosed in Patent Document 1, the threshold value and the mask period may need to be adjusted according to an expected distance to the target object. Accordingly, when setting of the threshold value or the mask period has been erroneously made or has been changed for the distance to the target object, reduction in accuracy in distance measurement may result.

In view of the above circumstances, it is desirable to provide an ultrasonic sensor control device that is capable of limiting influence of a direct wave of an ultrasonic wave transmitted from a transmission device of an ultrasonic sensor.

An ultrasonic sensor control device according to an embodiment of the present disclosure is an ultrasonic sensor control device that controls an ultrasonic sensor device configured to transmit and receive ultrasonic waves, the ultrasonic sensor control device including a transmission control section configured to control transmission of a transmission ultrasonic wave at a first frequency through the ultrasonic sensor device, a reception section configured to receive a reception ultrasonic wave through the ultrasonic sensor device, and a device control section configured to control the ultrasonic sensor device to set given frequencies as a transmission frequency of the transmission ultrasonic wave and a reception frequency of the reception ultrasonic wave. The device control section changes the reception frequency in such a manner that the reception frequency is a frequency different from the first frequency during a first period including at least a transmission period during which the transmission ultrasonic wave is transmitted.

An ultrasonic sensor according to another embodiment of the present disclosure includes an ultrasonic sensor device that includes diaphragms and which transmits and receives ultrasonic waves through vibration of the diaphragms, a transmission control section configured to control transmission of a transmission ultrasonic wave at a first frequency through the ultrasonic sensor device, a reception section configured to receive a reception ultrasonic wave through the ultrasonic sensor device, and a device control section configured to control the ultrasonic sensor device to set given frequencies as a transmission frequency of the transmission ultrasonic wave and a reception frequency of the reception ultrasonic wave. The device control section changes the reception frequency in such a manner that the reception frequency is a frequency different from the first frequency during a first period including at least a transmission period during which the transmission ultrasonic wave is transmitted.

According to an embodiment of the present disclosure, there is provided an ultrasonic sensor control device that is capable of limiting influence of a direct wave of an ultrasonic wave transmitted from a transmission device of an ultrasonic sensor.

DETAILED DESCRIPTION OF THE PREFERRED EMBODIMENTS

Next, embodiments of the present disclosure will be described below with reference to the accompanying drawings. In the accompanying drawings described below, identical or like portions or sections are designated by identical or like reference symbols. It is to be noted, however, that the accompanying drawings merely represent schematic diagrams, and that the actual relations between the thicknesses and dimensions in plan view of components and other actual relations are not represented in the accompanying drawings. Therefore, specific thicknesses and dimensions thereof should be determined with reference to the following descriptions. In addition, needless to say, the relations between the dimensions and the ratios therebetween may vary between different ones of the accompanying drawings.

Moreover, the embodiments described below are presented by way of example to illustrate devices and methods for embodying the technical idea of the present disclosure, and should not be construed to specify the materials, shapes, structures, arrangements, and other conditions of the components. Various modifications may be made to the embodiments without departing from the scope of the appended claims.

Specific embodiments of the present disclosure are as follows.

<1> An ultrasonic sensor control device that controls an ultrasonic sensor device configured to transmit and receive ultrasonic waves, the ultrasonic sensor control device including:
  a transmission control section configured to control transmission of a transmission ultrasonic wave at a first frequency through the ultrasonic sensor device;
  a reception section configured to receive a reception ultrasonic wave through the ultrasonic sensor device; and
  a device control section configured to control the ultrasonic sensor device to set given frequencies as a transmission frequency of the transmission ultrasonic wave and a reception frequency of the reception ultrasonic wave, in which
  the device control section changes the reception frequency in such a manner that the reception frequency is a frequency different from the first frequency during a first period including at least a transmission period during which the transmission ultrasonic wave is transmitted.

<2> The ultrasonic sensor control device as set forth in <1>, in which the first period includes the transmission period during which the transmission ultrasonic wave is transmitted and a second period after an end of the transmission period.

<3> The ultrasonic sensor control device as set forth in <2>, in which the second period is a given period after the end of the transmission period and until reverberations of the transmission ultrasonic wave are reduced in sound pressure to a given level or lower.

<4> The ultrasonic sensor control device as set forth in any one of <1> to <3>, in which the device control section changes the transmission frequency in such a manner that the transmission frequency is a frequency different from the first frequency during a third period after the end of the transmission period.

<5> The ultrasonic sensor control device as set forth in any one of <1> to <4>, in which the ultrasonic sensor device includes a transmission device and a reception device each including a diaphragm, and the device control section sets a frequency different from the first frequency as the transmission frequency and/or the reception frequency by changing a natural frequency of the diaphragm to an oscillation frequency that does not resonate with the first frequency.

<6> an Ultrasonic Sensor Including:
  an ultrasonic sensor device that includes diaphragms and which transmits and receives ultrasonic waves through vibration of the diaphragms;
  a transmission control section configured to control transmission of a transmission ultrasonic wave at a first frequency through the ultrasonic sensor device;
  a reception section configured to receive a reception ultrasonic wave through the ultrasonic sensor device; and
  a device control section configured to control the ultrasonic sensor device to set given frequencies as a transmission frequency of the transmission ultrasonic wave and a reception frequency of the reception ultrasonic wave, in which
  the device control section changes the reception frequency in such a manner that the reception frequency is a frequency different from the first frequency during a given period including at least a transmission period during which the transmission ultrasonic wave is transmitted.

First Embodiment

Figure 1:
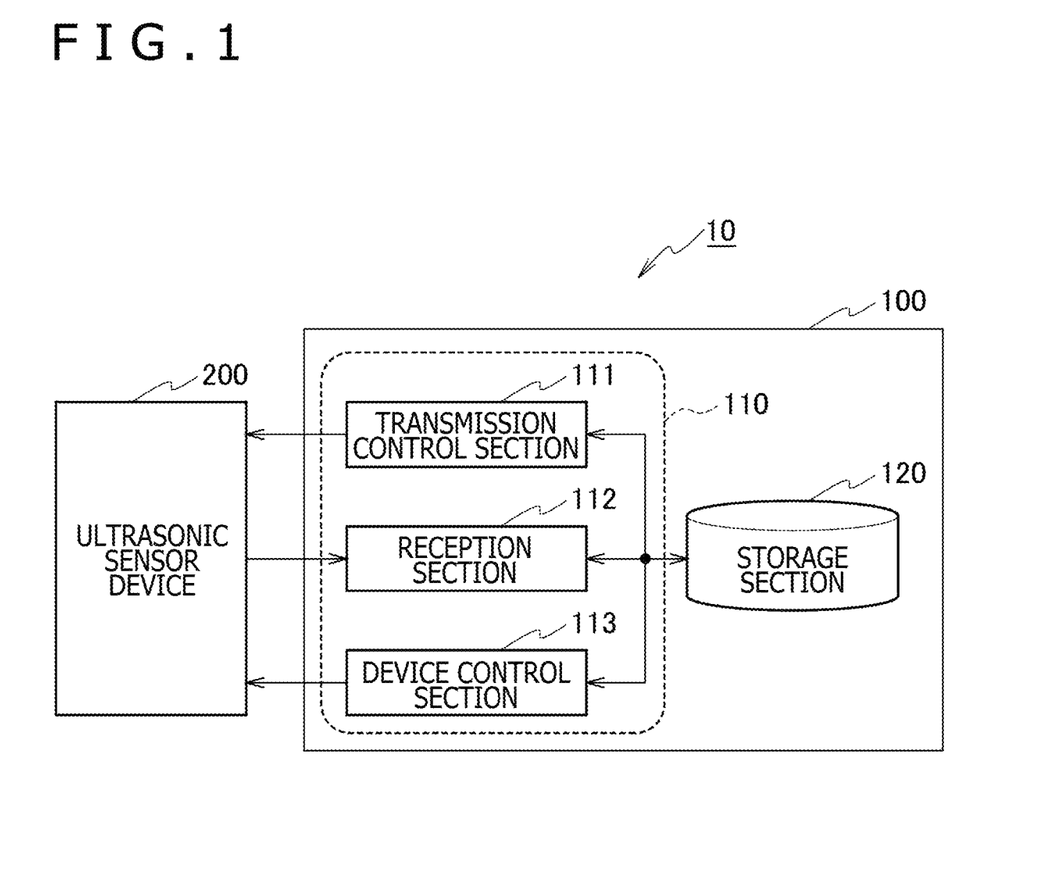
FIG. 1 is a block diagram illustrating a structure of an ultrasonic sensor control device according to a first embodiment of the present disclosure.

With reference to FIG. 1, a configuration of an ultrasonic sensor 10 according to a first embodiment of the present disclosure will be described below. The ultrasonic sensor 10 according to the first embodiment includes an ultrasonic sensor control device 100 and an ultrasonic sensor device 200. The ultrasonic sensor 10 is a sensor capable of transmitting ultrasonic waves through the ultrasonic sensor device 200 and further receiving ultrasonic waves through the ultrasonic sensor device 200. The ultrasonic sensor 10 is used, for example, in a distance measuring system that is capable of measuring a distance to a target object by causing an ultrasonic wave to be transmitted and measuring a time (time of flight (TOF)) until a return of the wave reflected from the target object. Details of the ultrasonic sensor control device 100 will be described below.

Figure 2:
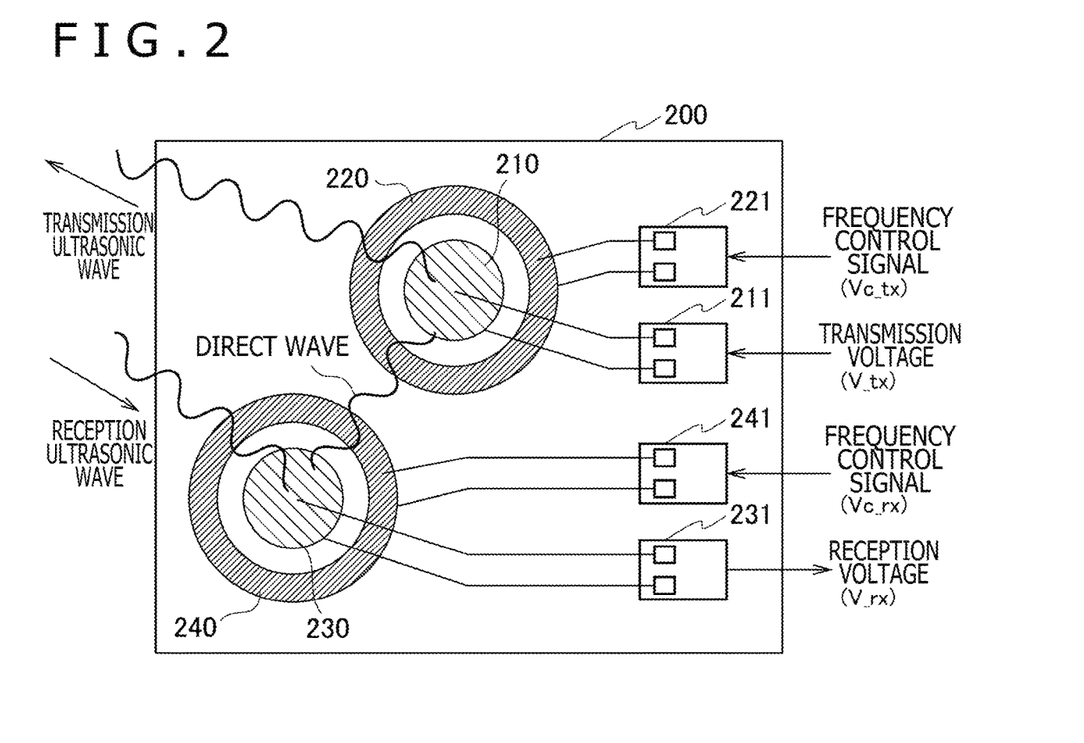
FIG. 2 is a schematic diagram illustrating an example of a structure of an ultrasonic sensor device according to the first embodiment.

FIG. 2 illustrates an example configuration of the ultrasonic sensor device 200 used in the ultrasonic sensor 10. The ultrasonic sensor device 200 is an ultrasonic sensor device including a transmission device 210 that transmits ultrasonic waves and a reception device 230 that receives ultrasonic waves. The ultrasonic sensor device 200 is formed by, for example, a transducer that utilizes piezoelectric effect. In the present embodiment, the transducer includes piezoelectric elements on both a transmission side and a reception side. On the transmission side, the transducer applies a drive voltage to the piezoelectric element to cause the piezoelectric element to vibrate, so that a diaphragm (not illustrated) being in contact with the transmission device 210 vibrates to produce a transmission ultrasonic wave. Meanwhile, on the reception side, the piezoelectric element vibrates on the basis of vibration of a diaphragm (not illustrated), and reception of a reception ultrasonic wave having a given frequency is detected by sensing an electrical signal generated by the vibration of the piezoelectric element.

The transmission device 210 is formed as a vibrator including a pair of electrodes, a piezoelectric film (not illustrated) held between the pair of electrodes, and the diaphragm. It is assumed that an upper electrode, which is one of the pair of electrodes on the upper side, is illustrated in the example illustrated in FIG. 2, which represents a top view of the ultrasonic sensor device 200 as viewed from above in a direction perpendicular to a plane on which the transmission device 210 and the reception device 230 are disposed. The transmission device 210 has the piezoelectric film (not illustrated) formed in such a manner as to be held between the upper and lower electrodes in a vertical direction. In addition, the diaphragm is in contact with the lower electrode. In other words, in the present embodiment, the transmission device 210 has the upper electrode, the piezoelectric film, the lower electrode, and the diaphragm stacked in the order named.

Each of the pair of electrodes is formed using, for example, a thin film of a metal having electrical conductivity, such as platinum, molybdenum, iridium, or titanium. One of the electrodes (specifically, the upper electrode) is positioned on the upper side of the piezoelectric film as mentioned above and is connected to an electrode pad section 211 for the transmission device 210, which has a circuit pattern for applying the drive voltage to the upper electrode. Similarly, the other electrode (i.e., the lower electrode) is positioned on the lower side of the piezoelectric film and is electrically connected to the electrode pad section 211 for the transmission device 210, which has a circuit pattern for applying the drive voltage to the lower electrode, via a wire.

The piezoelectric film is made of, for example, lead zirconate titanate (PZT). The piezoelectric film may alternatively be made of aluminum nitride (AlN), zinc oxide (ZnO), or lead titanate ($PbTiO_3$), for example, instead of lead zirconate titanate.

The diaphragm is formed by a thin film, and is arranged to be capable of shifting in position in a thickness direction of the diaphragm, i.e., along a normal to the diaphragm.

The drive voltage ($V\_tx$), which is supplied from the ultrasonic sensor control device 100, is applied to the upper electrode and the lower electrode of the transmission device 210 through the electrode pad section 211 for the transmission device 210. According to the drive voltage ($V\_tx$) supplied to the transmission device 210, the piezoelectric element and the diaphragm vibrate to produce the transmission ultrasonic wave.

As with the transmission device 210, the reception device 230 is formed as a vibrator including a pair of electrodes, a piezoelectric film (not illustrated) held between the pair of electrodes, and the diaphragm. In addition, the reception device 230 has the piezoelectric film (not illustrated) formed in such a manner as to be held between the upper and lower electrodes in the vertical direction. Further, the diaphragm is in contact with the lower electrode. In other words, in the present embodiment, the reception device 230 has the upper electrode, the piezoelectric film, the lower electrode, and the diaphragm stacked in the order named.

When an ultrasonic wave having a given frequency has reached the diaphragm of the reception device 230, a potential difference occurs between the upper electrode and the lower electrode of the reception device 230, producing a given voltage ($V\_rx$), so that reception of the ultrasonic wave is made possible by detecting the voltage ($V\_rx$). The produced voltage ($V\_rx$) is supplied to the ultrasonic sensor control device 100 through an electrode pad section 231 for the reception device 230.

In the present embodiment, a signal (i.e., an electrical signal) is produced through positive piezoelectric effect between the electrodes of the reception device 230, and this signal is taken out by the ultrasonic sensor control device 100. That is, the electrodes are used as a vibration sensor to sense this electrical signal. In general, a reception frequency that provides the highest sensitivity to a vibration sensor is a resonance frequency of a vibrator that forms a sensing device. In this system, the resonance frequency of the vibrator itself that forms the vibration sensor is adjusted for input from the outside, to bring the system into the most sensitive, and a more comfortable, condition.

In addition, the ultrasonic sensor device 200 includes a transmission frequency adjustment section 220 that adjusts a transmission frequency of the transmission ultrasonic wave to be transmitted from the transmission device 210, and a reception frequency adjustment section 240 that sets a reception frequency of an ultrasonic wave that can be received by the reception device 230.

The transmission frequency adjustment section 220 is provided with an electrode, and a given voltage is applied from the ultrasonic sensor control device 100 to this electrode to deform the transmission frequency adjustment section 220, to thereby set the frequency of the transmission ultrasonic wave to be transmitted from the transmission device 210.

Similarly, the reception frequency adjustment section 240 is provided with an electrode, and a given voltage is applied from the ultrasonic sensor control device 100 to this electrode to deform the reception frequency adjustment section 240, to thereby set the frequency of the reception ultrasonic wave that can be received by the reception device 230.

The application of the given voltages to the transmission frequency adjustment section 220 and the reception frequency adjustment section 240 can change physical properties, such as effective size and hardness, of the piezoelectric elements and the vibrators including the diaphragms. Thus, the ultrasonic sensor control device 100 is able to change the resonance frequencies (i.e., natural frequencies) of the vibrators. That is, the ultrasonic sensor control device 100 is able to set, as each of the transmission frequency and the reception frequency, a frequency different from a given specific frequency by changing the natural frequency of the diaphragm included in each of the transmission device 210 and the reception device 230 to an oscillation frequency that does not resonate with the specific frequency.

Referring back to FIG. 1, the ultrasonic sensor control device 100 will now be described below. The ultrasonic sensor control device 100 includes a control section 110 and a storage section 120. The ultrasonic sensor control device 100 may be formed as a general-purpose microcomputer including a central processing unit (CPU) (i.e., the control section 110), a memory (i.e., the storage section 120), an input/output section (not illustrated), and other components. In this case, a computer program for causing the microcomputer to function as the ultrasonic sensor control device 100 may be installed into the microcomputer. By executing the computer program, the microcomputer functions as a plurality of information processing circuits included in the ultrasonic sensor control device 100. Note that, although it is assumed in the present embodiment that the plurality of information processing circuits included in the ultrasonic sensor control device 100 are implemented in software, it will naturally be understood that the information processing circuits may alternatively be implemented in hardware with dedicated hardware being prepared for performing information processes described below. Also note that the plurality of information processing circuits may be formed by separate pieces of hardware. Details of the control section 110 will be described below.

Figure 3A:
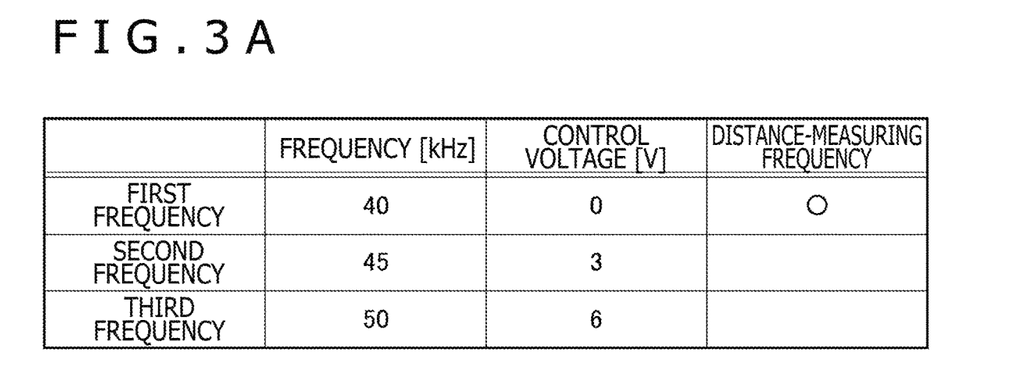
FIG. 3A is a diagram illustrating an example of frequency information according to the first embodiment.
Figure 3B:
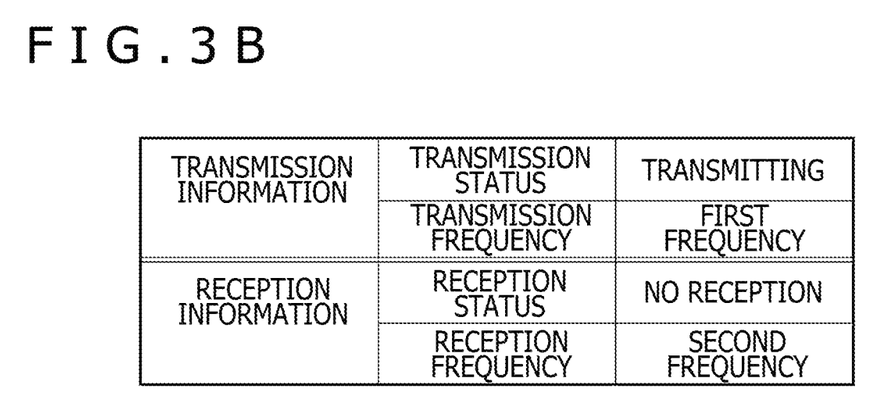
FIG. 3B is a diagram illustrating examples of transmission information and reception information according to the first embodiment.

The storage section 120 includes a read-only memory (ROM), a random-access memory (RAM), a hard disk, or other components and stores "frequency information," "transmission information," and "reception information." Specifically, the storage section 120 stores the "frequency information" as illustrated in FIG. 3A, and the "transmission information" and the "reception information" as illustrated in FIG. 3B. Note that the "frequency information," the "transmission information," and the "reception information" stored in the storage section 120 may be stored in physically or logically separated regions in a single storage device. Alternatively, the storage section 120 may include physically separate storage devices prepared for separate types of data.

Frequencies of ultrasonic waves that are supported by the ultrasonic sensor 10 are stored in the "frequency information" stored in the storage section 120. Specifically, frequencies of ultrasonic waves that can be received by the reception device 230 and transmitted by the transmission device 210 of the ultrasonic sensor device 200 are stored therein. In addition, values of the frequencies stored in the "frequency information" are arranged to be sufficiently apart from one another to prevent an interference, with Doppler shift and reception characteristics taken into account, for example. For example, in the example illustrated in FIG. 3A, 40 kHz, 45 kHz, and 50 kHz, which are apart from one another by 5 kHz, are stored as values of frequencies in fields of a first frequency, a second frequency, and a third frequency, respectively, in the "frequency information." The ultrasonic sensor control device 100 selects frequencies stored in the "frequency information" for the transmission and reception of ultrasonic waves.

In addition, corresponding control voltages for realizing the first frequency, the second frequency, and the third frequency are stored in the "frequency information." In the example illustrated in FIG. 3A, 0 V, 3 V, and 6 V are stored as the voltages corresponding to the first frequency, the second frequency, and the third frequency, respectively. For example, a voltage of 0 V is applied to an electrode pad section 221 for the transmission frequency adjustment section 220 when the first frequency is applied to the transmission ultrasonic wave to be transmitted by the transmission device 210. Similarly, a voltage of 3 V or a voltage of 6 V is applied to the electrode pad section 221 for the transmission frequency adjustment section 220 when the second frequency or the third frequency is applied to the transmission ultrasonic wave to be transmitted by the transmission device 210.

Figure 4:
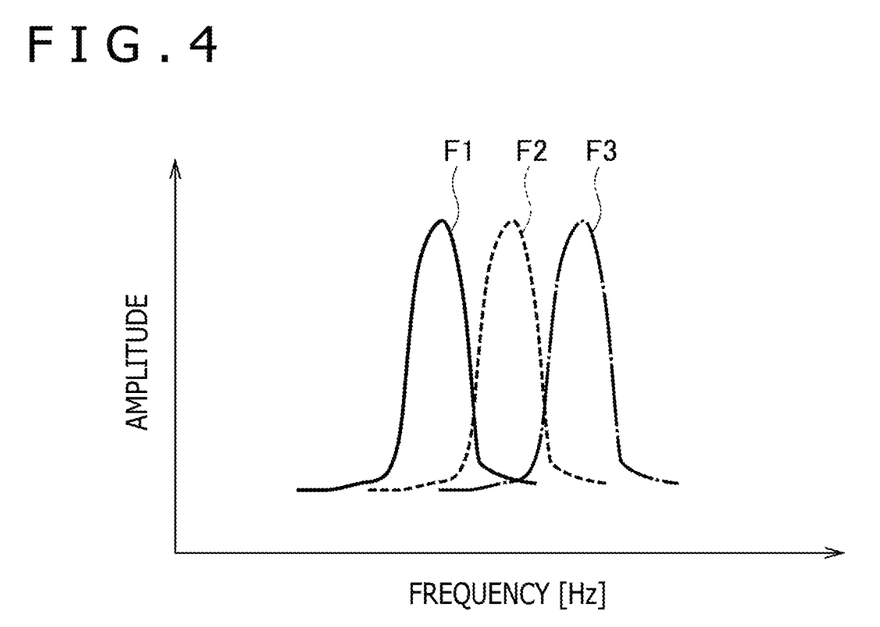
FIG. 4 is a diagram for explaining a relation between control voltages and frequencies.

FIG. 4 is a diagram for explaining characteristics of the frequencies corresponding to the respective control voltages. In FIG. 4, a frequency waveform F1, a frequency waveform F2, and a frequency waveform F3 represent the characteristics of the frequencies in the case of the voltages of 0 V, 3 V, and 6 V, respectively. In the present embodiment, the frequency at which the frequency waveform F1 has a maximum amplitude is referred to as the first frequency, the value of which is assumed to be 40 kHz. Similarly, the frequency at which the frequency waveform F2 has a maximum amplitude is referred to as the second frequency, the value of which is assumed to be 45 kHz. Further, the frequency at which the frequency waveform F3 has a maximum amplitude is referred to as the third frequency, the value of which is assumed to be 50 kHz. As illustrated in FIG. 4, the characteristics of the waveforms representing the amplitudes of the frequencies vary depending on the corresponding control voltage.

Further, information regarding a "distance-measuring frequency," which indicates which of the frequencies set in the "frequency information" is a frequency used for distance measurement, is stored in the "frequency information." Here, the frequency corresponding to the "distance-measuring frequency" is a transmission frequency of a transmission ultrasonic wave to be transmitted by the ultrasonic sensor 10, and a reception frequency that can be received by the ultrasonic sensor 10 as a reflected wave coming from the target object. In the example illustrated in FIG. 3A, a circle is stored in the field of the frequency corresponding to the "distance-measuring frequency." In the present embodiment, the first frequency, for example, corresponds to the "distance-measuring frequency."

The ultrasonic sensor control device 100 may be configured to enable the "distance-measuring frequency" to be set in advance, for example, by allowing a user to set the "distance-measuring frequency" through the input/output section of the ultrasonic sensor control device 100. In addition, a frequency different from the first frequency may be set as the "distance-measuring frequency" to avoid an interference with a frequency of an ultrasonic wave of another system. Also in this case, the ultrasonic sensor control device 100 may be configured to allow the user to set the "distance-measuring frequency" through the input/output section of the ultrasonic sensor control device 100, for example.

Information regarding "transmission status" and "transmission frequency" of the transmission ultrasonic wave transmitted from the transmission device 210 is stored in the "transmission information" illustrated in FIG. 3B. In the "transmission status," the transmission status of the transmission ultrasonic wave transmitted from the transmission device 210, such as "before transmission," "transmitting," or "transmitted," is stored. Meanwhile, in the "transmission frequency," a transmission frequency that is to be transmitted is stored in the case where the "transmission status" is "before transmission," a transmission frequency that is being transmitted is stored in the case where the "transmission status" is "transmitting," and a transmission frequency that has been transmitted is stored in the case where the "transmission status" is "transmitted." The example illustrated in FIG. 3B indicates a state in which a transmission ultrasonic wave having the first frequency as the transmission frequency is being transmitted.

Information regarding "reception status" and "reception frequency" of the reception ultrasonic wave received at the reception device 230 is stored in the "reception information" illustrated in FIG. 3B. In the "reception status," information indicating whether reception of a reception ultrasonic wave has occurred or not, for example, is stored. Meanwhile, in the "reception frequency," the reception frequency that can be received by the reception device 230 is stored. The example illustrated in FIG. 3B indicates a state in which the reception frequency that can be received is the second frequency and no reception ultrasonic wave has been received yet.

Next, functions of the control section 110 of the ultrasonic sensor control device 100 illustrated in FIG. 1 will now be described below. The control section 110 includes a transmission control section 111, a reception section 112, and a device control section 113 as functional blocks.

The transmission control section 111 controls the transmission of the transmission ultrasonic wave in relation to the transmission device 210. Specifically, the transmission control section 111 causes the transmission ultrasonic wave to be transmitted from the transmission device 210 at the "transmission frequency" in the "transmission information" (FIG. 3B) stored in the storage section 120. In addition, the transmission control section 111 updates the "transmission status" of the transmission information stored in the storage section 120, according to the transmission status of the transmission ultrasonic wave.

The reception section 112 receives the reception ultrasonic wave through the reception device 230 and stores reception information regarding the received ultrasonic wave in the storage section 120. Specifically, the reception section 112 receives the reception ultrasonic wave through the reception device 230 with the "reception frequency" in the "reception information" (FIG. 3B) stored in the storage section 120, and stores data indicating "received" in the "reception status" of the reception information stored in the storage section 120.

The device control section 113 controls the transmission frequency adjustment section 220 and the reception frequency adjustment section 240 on the basis of the "frequency information" (FIG. 3A) stored in the storage section 120. It is assumed in the present embodiment that the first frequency is the frequency of the transmission ultrasonic wave transmitted by the transmission device 210, and the frequency that can be received by the reception device 230 and that is the frequency for the reception ultrasonic wave which is a reflection of the transmission ultrasonic wave. That is, it is assumed in the following description that the frequency (i.e., the distance-measuring frequency) used in the distance measurement by the ultrasonic sensor 10 in the present embodiment is the first frequency. Note that the use of the first frequency as the frequency used in the distance measurement by the ultrasonic sensor 10 is not essential to the configuration of the present embodiment, and that the second frequency or the third frequency may alternatively be used as the frequency (i.e., the distance-measuring frequency) used in the distance measurement by the ultrasonic sensor 10 to prevent an interference with another system.

In addition, the device control section 113 is able to set a frequency different from the first frequency as each of the transmission frequency and the reception frequency by changing the natural frequency of the diaphragm provided in each of the transmission device 210 and the reception device 230 to an oscillation frequency that does not resonate with the first frequency.

Figure 5A:
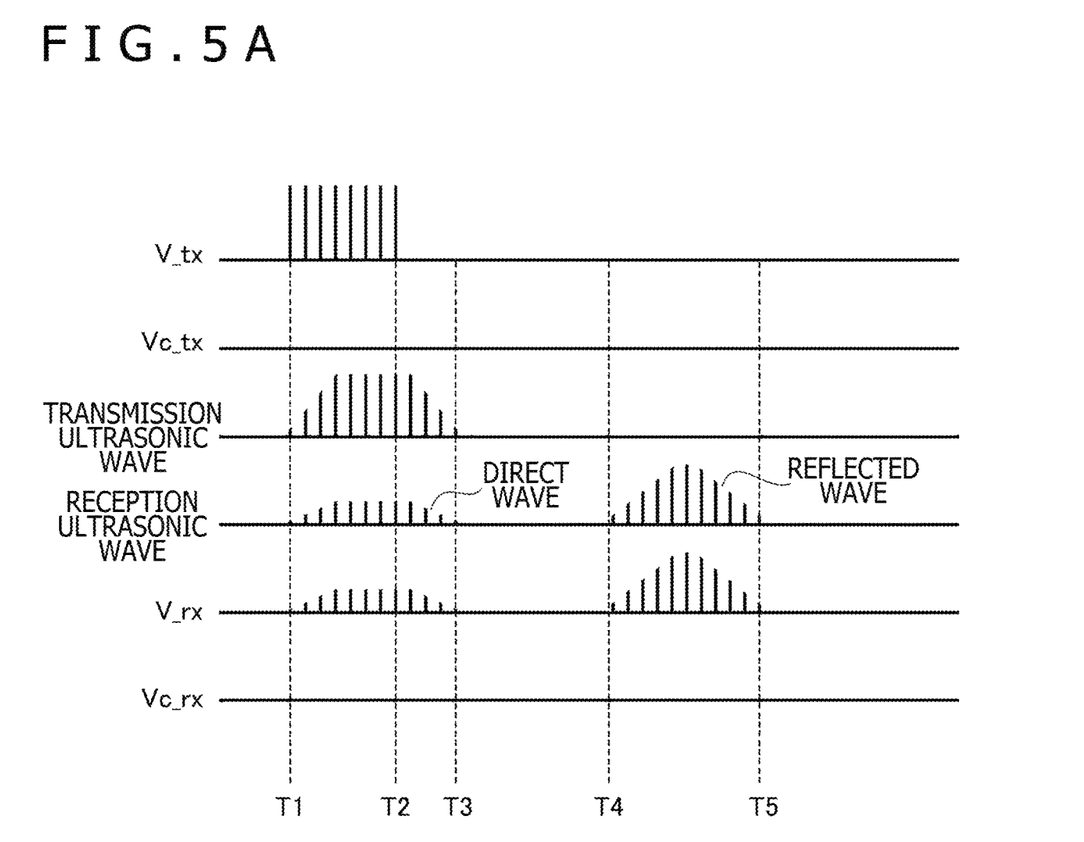
FIG. 5A is a diagram for explaining a direct wave and reverberations in an ultrasonic sensor.
Figure 5B:
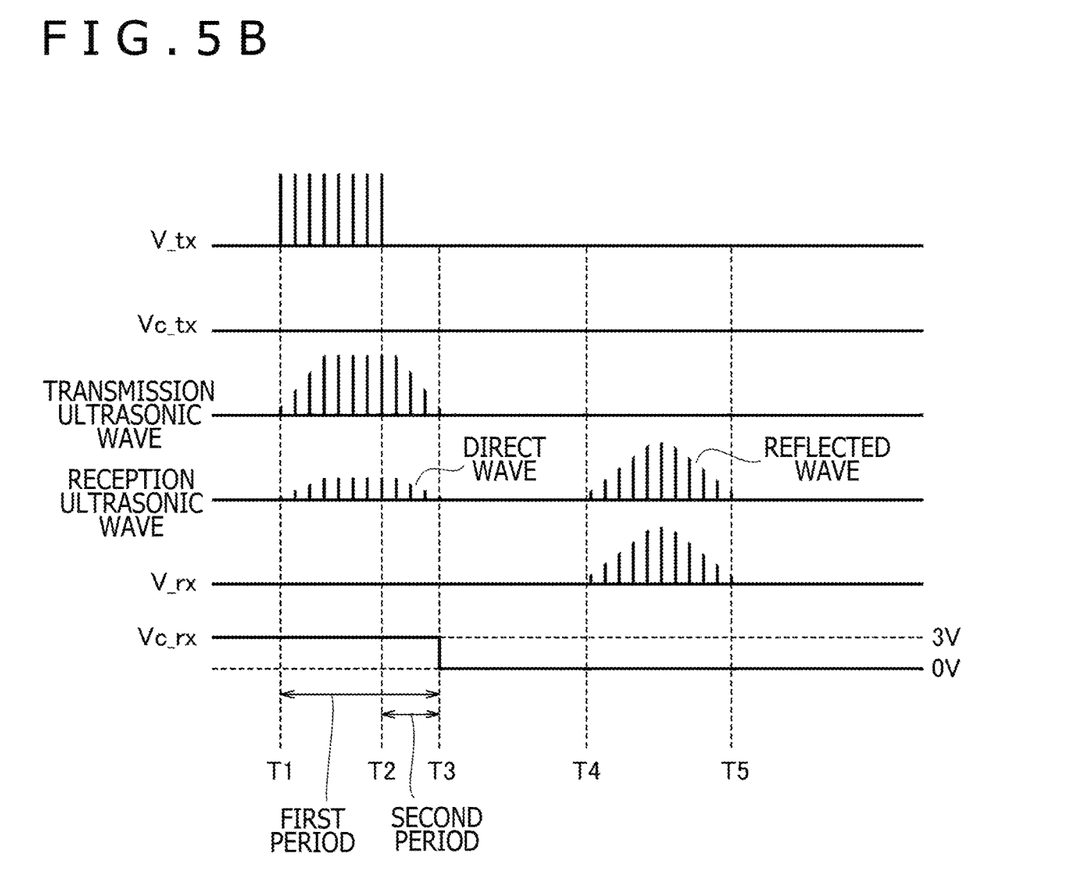
FIG. 5B is a timing diagram for explaining processes in an ultrasonic sensor according to the first embodiment.

With reference to FIGS. 5A and 5B, processes performed by the ultrasonic sensor control device 100 according to the first embodiment will now be described below. FIG. 5A is a diagram for explaining an effect of a direct wave on an ultrasonic sensor according to a comparative example to which the present embodiment is not applied. FIG. 5B is a diagram for explaining processes in the case where the ultrasonic sensor control device 100 according to the first embodiment is employed.

In the comparative example illustrated in FIG. 5A, the transmission control section 111 outputs (applies) a drive voltage (V_tx) for driving the transmission device 210 to the transmission device 210 during a period from a time T1 to a time T2. Due to the output of the drive voltage (V_tx) from the transmission control section 111 to the transmission device 210, a pulse wave as represented in the "transmission ultrasonic wave" is transmitted during a period from the time T1 to a time T3 in FIG. 5A. Note that, in the comparative example illustrated in FIG. 5A, reverberations of the transmission ultrasonic wave are present during a period from the time T2 to the time T3.

The transmission ultrasonic wave transmitted during the period from the time T1 to the time T3 is transferred through a board or is reflected by a housing in the vicinity, for example, resulting in a direct wave appearing as a reception ultrasonic wave. The time taken for a reflected wave, which is reflected by the target object and returns, to be reflected and return varies depending on the distance to the target object, but it takes a substantially constant time for the above-described direct wave, which is caused by a fixed environment, to reach the reception device 230. In addition, vibration of the reception ultrasonic wave is sensed by the diaphragm of the reception device 230, and voltage represented in V_rx is supplied to the ultrasonic sensor control device 100. Thus, in the comparative example illustrated in FIG. 5A, the direct wave during the period from the time T1 to the time T3 is received by the reception device 230. That is, the reception device 230 receives the reception ultrasonic wave at a time before a reflected reception ultrasonic wave is received during a period from a time T4 to a time T5, and thus, an erroneous distance measurement will be made in the comparative example illustrated in FIG. 5A to which the present embodiment is not applied. It is assumed in the comparative example illustrated in FIG. 5A that a voltage (Vc_tx) for adjusting the transmission frequency of the transmission ultrasonic wave is 0 V, and that an ultrasonic wave having the first frequency, i.e., a frequency of 40 kHz, is transmitted. It is further assumed in the comparative example illustrated in FIG. 5A that a voltage (Vc_rx) for adjusting the reception frequency of the reception ultrasonic wave is 0 V, and that an ultrasonic wave having the first frequency, i.e., a frequency of 40 kHz, is received.

In the example of the ultrasonic sensor control device 100 according to the first embodiment illustrated in FIG. 5B, a given voltage is applied as the voltage (Vc_rx) for adjusting the reception frequency of the reception ultrasonic wave during a period up to the time T3. In the example illustrated in FIG. 5B, the given voltage is 3 V, which changes the reception frequency of the reception ultrasonic wave to the second frequency (45 kHz). That is, during the period up to the time T3, the reception frequency is set in such a manner that a reception ultrasonic wave having the second frequency, which is a frequency different from the first frequency, which is the frequency of the transmission ultrasonic wave transmitted from the transmission device 210, can be received by the reception device 230. Note that the period from the time T1 to the time T3 includes at least a transmission period during which the transmission ultrasonic wave is transmitted. This period including at least the transmission period during which the transmission ultrasonic wave is transmitted corresponds to a first period. Further, the period from the time T2 to the time T3 is a given period after an end of the transmission of the transmission ultrasonic wave and until reverberations of the transmission ultrasonic wave are reduced in sound pressure to a given level or lower. This given period after the end of the transmission of the transmission ultrasonic wave corresponds to a second period.

During the period from the time T1 to the time T3 illustrated in FIG. 5B, no waveform of a reception ultrasonic wave appears in V_rx, which represents reception of a reception frequency. This indicates that the reception device 230 does not receive a reception ultrasonic wave during the period from the time T1 to the time T3. Thus, in the example illustrated in FIG. 5B, the transmission ultrasonic wave transmitted during the period from the time T1 to the time T2 is received as a reflected wave during the period from the time T4 to the time T5. That is, the example illustrated in FIG. 5B indicates that the ultrasonic sensor control device 100 is able to accurately measure the distance to the target object.

(Outline of Processing Flow of Ultrasonic Sensor Control Device 100)

Figure 6:
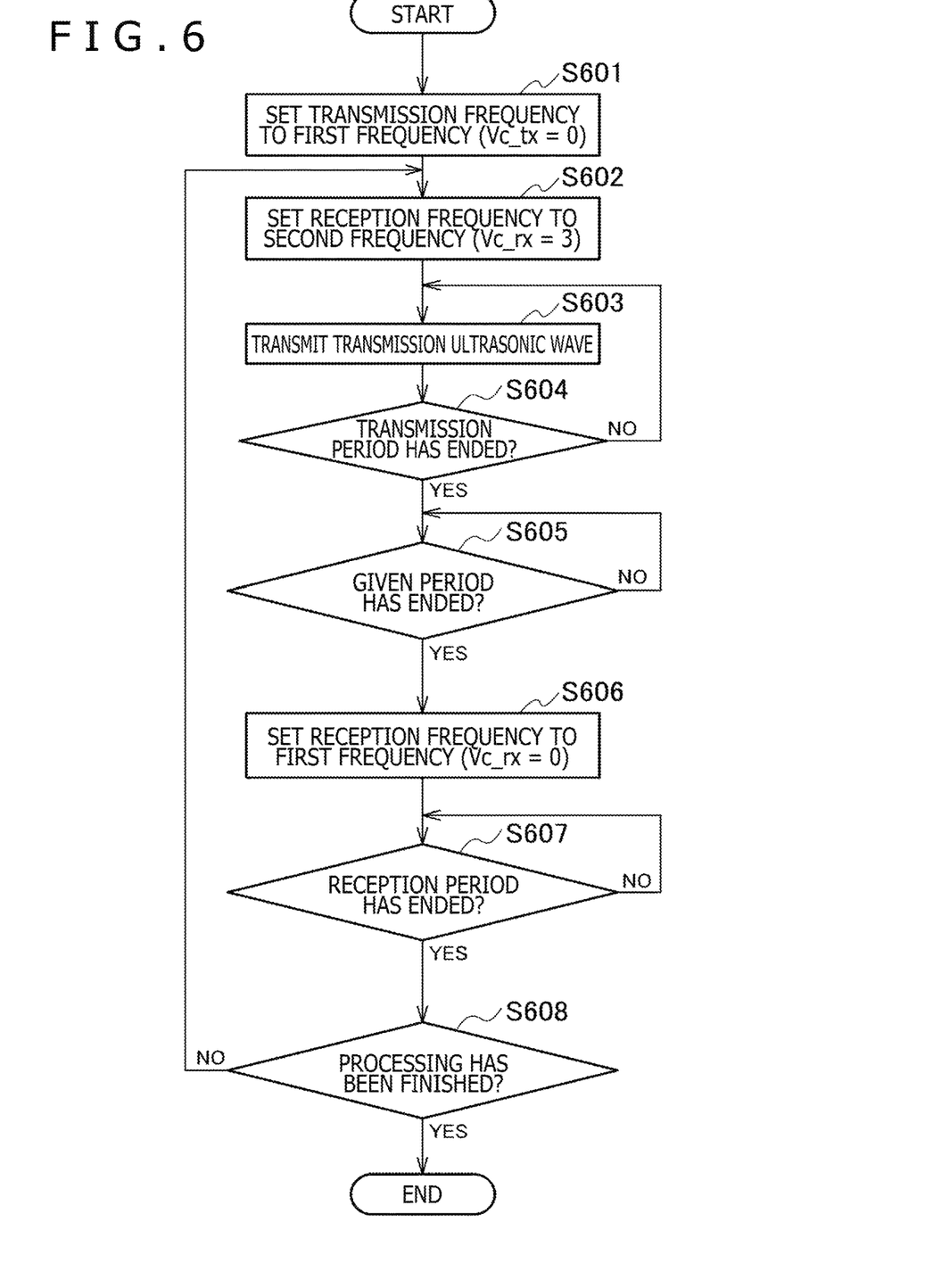
FIG. 6 is a flowchart illustrating an example of processing of the ultrasonic sensor control device according to the first embodiment.

Next, with reference to a flowchart illustrated in FIG. 6, a flow of processing (i.e., an ultrasonic sensor control method) performed in the ultrasonic sensor control device 100 will now be described below. Processing of the flowchart illustrated in FIG. 6 ends at power-off or upon receipt of an interrupt for ending the processing. Note that, in the following description of the flowchart, features that have already been described in the foregoing description of the ultrasonic sensor control device 100 will not be described again or will be described only briefly. Also note that, for a determination as to each period, a time-out period that involves time measurement by a timer (not illustrated) may be provided, and the processing may be finished by a time-out interrupt after the time-out period has elapsed.

At step S601, the device control section 113 sets the transmission frequency to the first frequency. Specifically, the device control section 113 sets the voltage (Vc_tx) of the transmission frequency adjustment section 220 to the voltage (0 V) for the first frequency. Note that the ultrasonic sensor device 200 according to the present embodiment transmits an ultrasonic wave having a frequency of 40 kHz (i.e., an ultrasonic wave having the first frequency) in the case where the voltage (Vc_tx) of the transmission frequency adjustment section 220 is a voltage of 0 V.

At step S602, the device control section 113 sets the reception frequency to the second frequency. Specifically, the device control section 113 sets the voltage (Vc_rx) of the reception frequency adjustment section 240 to the voltage (3 V) for the second frequency. Note that it is assumed that the ultrasonic sensor device 200 according to the present embodiment is able to receive an ultrasonic wave having a frequency of 45 kHz (i.e., an ultrasonic wave having the second frequency) in the case where the voltage (Vc_rx) of the reception frequency adjustment section 240 is a voltage of 3 V.

At step S603, the transmission control section 111 starts the transmission of the transmission ultrasonic wave. Specifically, the transmission control section 111 applies a given voltage to the transmission device 210 of the ultrasonic sensor device 200, thereby transmitting the transmission ultrasonic wave through the transmission device 210. In the example of FIG. 6, the ultrasonic wave transmitted at step S603 is an ultrasonic wave having the first frequency, i.e., a frequency of 40 kHz.

At step S604, the control section 110 determines whether or not the transmission period during which the transmission ultrasonic wave is transmitted has ended. Specifically, the control section 110 determines whether or not a transmission period determined in advance and stored in the storage section 120 of the ultrasonic sensor control device 100 has ended. This transmission period may be set by a user through the input/output section of the ultrasonic sensor control device 100. Alternatively, a value of the transmission period which is determined according to characteristics of the ultrasonic sensor device 200 may be stored in advance in the storage section 120 and be used.

If the control section 110 determines at step S604 that the transmission period during which the transmission ultrasonic wave is transmitted has ended (step S604: YES), control proceeds to step S605. Meanwhile, if the control section 110 determines at step S604 that the transmission period during which the transmission ultrasonic wave is transmitted has not ended yet (step S604: NO), control returns to step S603. That is, the control section 110 repeats the processes of steps S603 and S604 until the transmission period ends.

At step S605, the control section 110 determines whether or not a given period has elapsed after the end of the transmission period. It is assumed that this given period includes a period during which reverberations of the transmission ultrasonic wave are present. If the control section 110 determines at step S605 that the given period has ended (step S605: YES), control proceeds to step S606. Meanwhile, if the control section 110 determines at step S605 that the given period has not ended yet (step S605: NO), control returns to step S605. That is, the control section 110 repeats the process of step S605 until the given period ends after the end of the transmission period.

At step S606, the device control section 113 sets the reception frequency to the first frequency. Specifically, the device control section 113 sets the voltage (Vc_rx) of the reception frequency adjustment section 240 to the voltage (0 V) for the first frequency. Note that it is assumed that the ultrasonic sensor device 200 according to the present embodiment is able to receive an ultrasonic wave having a frequency of 40 kHz (i.e., an ultrasonic wave having the first frequency) in the case where the voltage (Vc_rx) of the reception frequency adjustment section 240 is a voltage of 0 V. That is, the device control section 113 sets the voltage in such a manner that the ultrasonic wave transmitted from the ultrasonic sensor device 200 at the first frequency will have a receivable frequency.

At step S607, the control section 110 determines whether or not a reception period for the reception ultrasonic wave has ended. It is assumed that the reception period for the reception ultrasonic wave is determined in advance and stored in the storage section 120. This reception period may be set by a user through the input/output section of the ultrasonic sensor control device 100. Alternatively, a value of the reception period which is determined according to the characteristics of the ultrasonic sensor device 200 may be stored in advance in the storage section 120 and be used.

If the control section 110 determines at step S607 that the reception period for the reception ultrasonic wave has ended (step S607: YES), control proceeds to step S608. Meanwhile, if the control section 110 determines at step S607 that the reception period for the reception ultrasonic wave has not ended yet (step S607: NO), control returns to step S607. That is, the control section 110 repeats the process of step S607 until the reception period ends.

At step S608, the control section 110 determines whether or not the processing of the ultrasonic sensor control device 100 has been finished. Specifically, the control section 110 determines whether or not processing for distance measurement in the ultrasonic sensor control device 100 has been finished. If the control section 110 determines at step S608 that the processing of the ultrasonic sensor control device 100 has been finished (step S608: YES), the processing of the ultrasonic sensor control device 100 ends. Meanwhile, if the control section 110 determines at step S608 that the processing of the ultrasonic sensor control device 100 has not been finished yet (step S608: NO), control returns to step S602, and the processes of steps S602 to S608 are repeated.

As described above, the ultrasonic sensor control device 100 according to the first embodiment, which controls the ultrasonic sensor device that transmits and receives ultrasonic waves, includes the transmission control section 111, the reception section 112, and the device control section 113. The transmission control section 111 controls transmission of the transmission ultrasonic wave at the first frequency through the ultrasonic sensor device. The reception section 112 receives the reception ultrasonic wave through the ultrasonic sensor device. The device control section 113 controls the ultrasonic sensor device to set given frequencies as the transmission frequency of the transmission ultrasonic wave and the reception frequency of the reception ultrasonic wave. The device control section 113 changes the reception frequency in such a manner that the reception frequency is a frequency different from the first frequency during the first period including at least the transmission period during which the transmission ultrasonic wave is transmitted.

Thus, the ultrasonic sensor control device 100 is able to limit the influence of a direct wave of the ultrasonic wave transmitted from the transmission device 210 of the ultrasonic sensor 10.

In addition, the first period in the ultrasonic sensor control device 100 according to the first embodiment includes the transmission period during which the transmission ultrasonic wave is transmitted and the second period after the end of the transmission period. Thus, the ultrasonic sensor control device 100 is able to limit the influence of the direct wave of the ultrasonic wave transmitted from the transmission device 210 of the ultrasonic sensor 10 and further reduce influence of reverberations of the transmission ultrasonic wave transmitted from the transmission device 210.

In addition, the second period in the ultrasonic sensor control device 100 according to the first embodiment is a given period after the end of the transmission period and until the reverberations of the transmission ultrasonic wave are reduced in sound pressure to a given level or lower. Thus, the ultrasonic sensor control device 100 is able to more securely reduce the influence of the reverberations of the transmission ultrasonic wave transmitted from the transmission device 210.

Furthermore, the device control section 113 of the ultrasonic sensor control device 100 according to the first embodiment changes the natural frequency of the diaphragm provided in at least one of the transmission device 210 and the reception device 230 of the ultrasonic sensor device 200 to an oscillation frequency that does not resonate with the first frequency. That is, the device control section 113 is able to set a frequency different from the first frequency as the transmission frequency and/or the reception frequency by changing the natural frequency of the diaphragm provided in at least one of the transmission device 210 and the reception device 230 to an oscillation frequency that does not resonate with the first frequency. Thus, the ultrasonic sensor control device 100 according to the first embodiment is able to limit the influence of a direct wave and reverberations of the ultrasonic wave transmitted from the transmission device 210 on the ultrasonic sensor 10 provided with the diaphragm or diaphragms.

Second Embodiment

While one specific embodiment of the present disclosure has been described above, it is to be understood that the above-described embodiment has been presented by way of example only and is not meant to limit embodiments of the present disclosure. For example, in the above-described embodiment, which has been presented by way of example, the reception frequency of the reception ultrasonic wave is changed in such a manner that the reception frequency is a frequency different from the transmission frequency during the transmission period during which the transmission ultrasonic wave is transmitted and the given period after the end of the transmission period. In an ultrasonic sensor control device 100 according to a second embodiment of the present disclosure, after the end of the transmission period during which the transmission ultrasonic wave is transmitted, the transmission frequency of the transmission ultrasonic wave is changed to a frequency different from the transmission frequency of the transmission ultrasonic wave transmitted in the transmission period. The ultrasonic sensor control device 100 according to the second embodiment will now be described below with focus on differences from the first embodiment.

Figure 7:
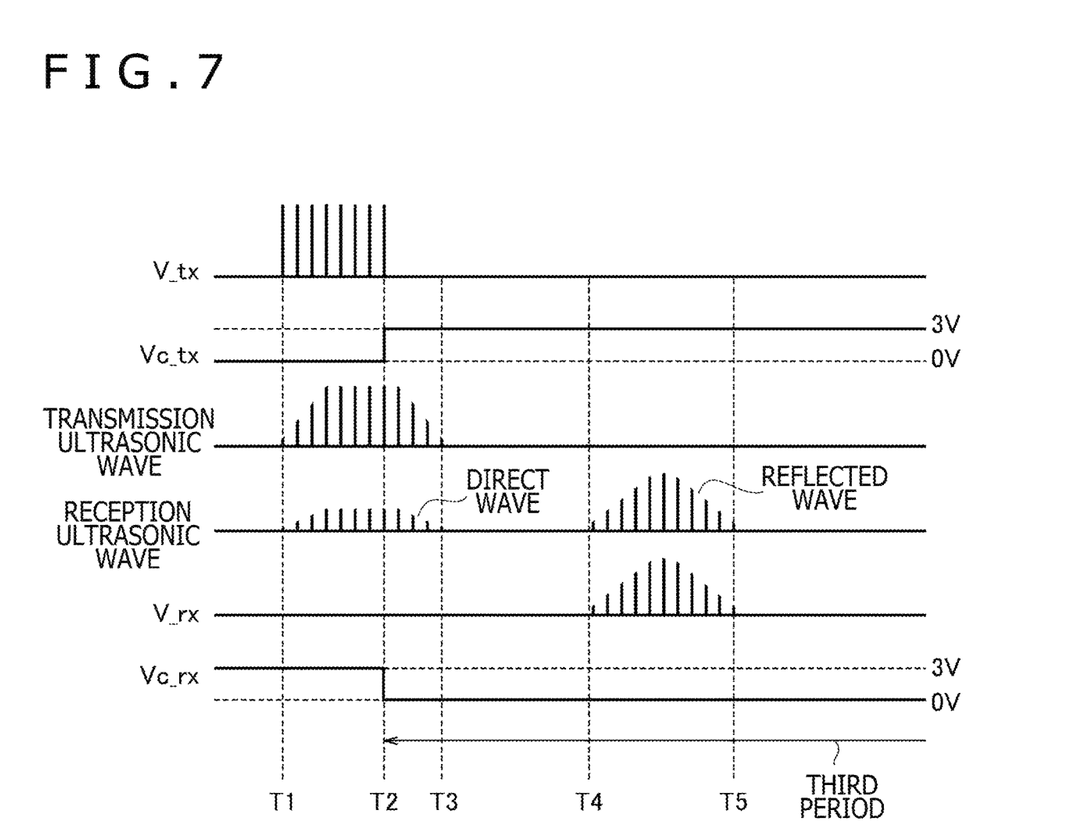
FIG. 7 is a timing diagram for explaining processes in an ultrasonic sensor according to a second embodiment of the present disclosure.

FIG. 7 represents an example of a timing diagram regarding processes of transmission and reception of ultrasonic waves in an ultrasonic sensor 10 according to the second embodiment. As illustrated in FIG. 7, in the second embodiment, output of a drive voltage (V_tx) from a transmission control section 111 to a transmission device 210 is started at a time T1. Then, at a time T2, the output of the drive voltage (V_tx) from the transmission control section 111 to the transmission device 210 ends. At the time T2, i.e., at the end of the output of the drive voltage (V_tx) from the transmission control section 111 to the transmission device 210, the voltage (3 V) for the second frequency is applied as the voltage (Vc_tx) of a transmission frequency adjustment section 220. That is, the frequency of the transmission ultrasonic wave is changed from the first frequency to the second frequency. In a period from the time T2 to a time T3, reverberations of the transmission ultrasonic wave are present, but the frequency of the reverberations during this period is the second frequency, which is different from the first frequency, i.e., the reception frequency at and after the time T2. Therefore, a reception section 112 does not receive reverberations of a direct wave from the transmission device 210 during the period from the time T2 to the time T3.

When a given period has elapsed after the change of the voltage (Vc_tx) of the transmission frequency adjustment section 220 to the voltage (3 V) for the second frequency at the time T2, the voltage (Vc_tx) of the transmission frequency adjustment section 220 is changed back to the voltage (0 V) for the first frequency. This given period may be, for example, a period until next transmission of a transmission frequency from the transmission device 210. Note that the given period from the change of the voltage (Vc_tx) of the transmission frequency adjustment section 220 to the voltage (3 V) for the second frequency at the time T2 to the change of the voltage (Vc_tx) back to the voltage (0 V) for the first frequency corresponds to a third period.

Moreover, in the second embodiment, the voltage (Vc_rx) of a reception frequency adjustment section 240 is changed from the voltage (3 V) for the second frequency to the voltage (0 V) for the first frequency at the time T2. In the second embodiment, reception of a reception ultrasonic wave having the first frequency is made possible at the time T2, but as described above, the voltage for the transmission frequency, i.e., the voltage (Vc_tx) of the transmission frequency adjustment section 220, is changed to the voltage (3V) for the second frequency at the time T2. Accordingly, at and after the time T2, the reception device 230 does not receive the reverberations. Thus, reception of a reception ultrasonic wave is made possible immediately after the transmission of the transmission ultrasonic wave, which makes it possible to, for example, more accurately measure the distance to a target object at a short distance with no reverberations affecting the distance measurement.

(Outline of Processing Flow of Ultrasonic Sensor Control Device 100)

Figure 8:
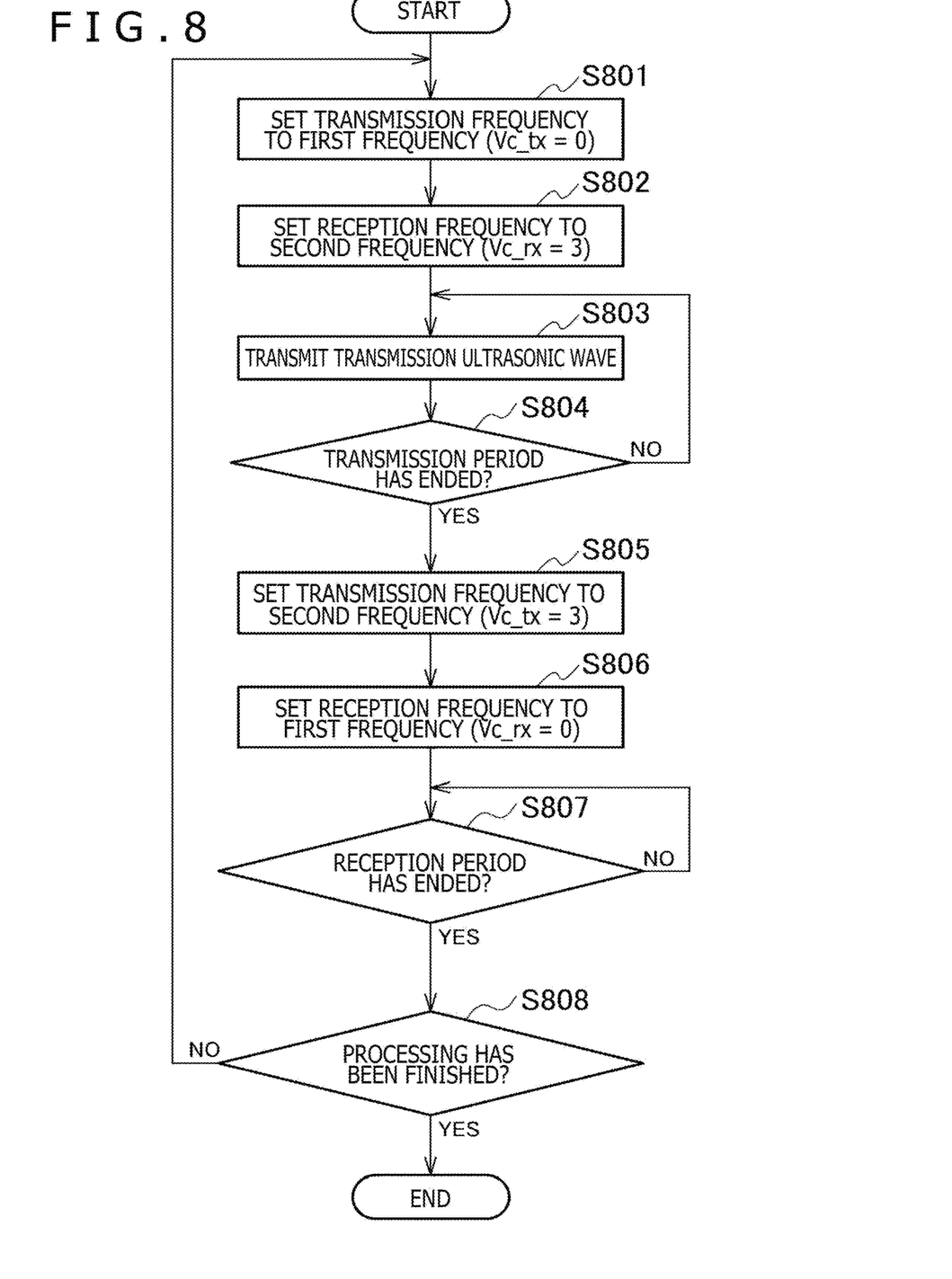
FIG. 8 is a flowchart illustrating an example of processing of an ultrasonic sensor control device according to the second embodiment.

Next, with reference to a flowchart illustrated in FIG. 8, a flow of processing (i.e., an ultrasonic sensor control method) performed in the ultrasonic sensor control device 100 according to the second embodiment will now be described below. Processing of the flowchart illustrated in FIG. 8 ends at power-off or upon receipt of an interrupt for ending the processing. Note that, in the following description of the flowchart, features that have already been described in the foregoing description of the ultrasonic sensor control device 100 will not be described again or will be described only briefly. Also note that, for a determination as to each period, a time-out period that involves time measurement by a timer (not illustrated) may be provided, and the processing may be finished by a time-out interrupt after the time-out period has elapsed.

At step S801, a device control section 113 sets the transmission frequency to the first frequency. Specifically, the device control section 113 sets the voltage (Vc_tx) of the transmission frequency adjustment section 220 to the voltage (0 V) for the first frequency. Note that an ultrasonic sensor device 200 according to the present embodiment transmits an ultrasonic wave having a frequency of 40 kHz (i.e., an ultrasonic wave having the first frequency) in the case where the voltage (Vc_tx) of the transmission frequency adjustment section 220 is a voltage of 0 V.

At step S802, the device control section 113 sets the reception frequency to the second frequency. Specifically, the device control section 113 sets the voltage (Vc_rx) of the reception frequency adjustment section 240 to the voltage (3 V) for the second frequency. Note that it is assumed that the ultrasonic sensor device 200 according to the present embodiment is able to receive an ultrasonic wave having a frequency of 45 kHz (i.e., an ultrasonic wave having the second frequency) in the case where the voltage (Vc_rx) of the reception frequency adjustment section 240 is a voltage of 3 V.

At step S803, the transmission control section 111 starts the transmission of the transmission ultrasonic wave. Specifically, the transmission control section 111 applies a given voltage to the transmission device 210 of the ultrasonic sensor device 200, thereby transmitting the transmission ultrasonic wave through the transmission device 210. In the example of FIG. 8, the ultrasonic wave transmitted at step S803 is an ultrasonic wave having the first frequency, i.e., a frequency of 40 kHz.

At step S804, a control section 110 determines whether or not the transmission period during which the transmission ultrasonic wave is transmitted has ended. Specifically, the control section 110 determines whether or not a transmission period set in advance in a storage section 120 of the ultrasonic sensor control device 100 has ended. If the control section 110 determines at step S804 that the transmission period during which the transmission ultrasonic wave is transmitted has ended (step S804: YES), control proceeds to step S805. Meanwhile, if the control section 110 determines at step S804 that the transmission period during which the transmission ultrasonic wave is transmitted has not ended yet (step S804: NO), control returns to step S803. That is, the control section 110 repeats the processes of steps S803 and S804 until the transmission period ends.

At step S805, the device control section 113 sets the transmission frequency to the second frequency. Specifically, the device control section 113 sets the voltage (Vc_tx) of the transmission frequency adjustment section 220 to the voltage (3 V) for the second frequency. Note that the ultrasonic sensor device 200 according to the present embodiment transmits an ultrasonic wave having a frequency of 45 kHz (i.e., an ultrasonic wave having the second frequency) in the case where the voltage (Vc_tx) of the transmission frequency adjustment section 220 is a voltage of 3 V.

At step S806, the device control section 113 sets the reception frequency to the first frequency. Specifically, the device control section 113 sets the voltage (Vc_rx) of the reception frequency adjustment section 240 to the voltage (0 V) for the first frequency. Note that it is assumed that the ultrasonic sensor device 200 according to the present embodiment is able to receive an ultrasonic wave having a frequency of 40 kHz (i.e., an ultrasonic wave having the first frequency) in the case where the voltage (Vc_rx) of the reception frequency adjustment section 240 is a voltage of 0 V.

At step S807, the control section 110 determines whether or not a reception period for the reception ultrasonic wave has ended. It is assumed that the reception period for the reception ultrasonic wave is determined in advance and stored in the storage section 120. This reception period may be set by a user through an input/output section of the ultrasonic sensor control device 100. Alternatively, a value of the reception period which is determined according to the characteristics of the ultrasonic sensor device 200 may be stored in advance in the storage section 120 and be used.

If the control section 110 determines at step S807 that the reception period for the reception ultrasonic wave has ended (step S807: YES), control proceeds to step S808. Meanwhile, if the control section 110 determines at step S807 that the reception period for the reception ultrasonic wave has not ended yet (step S807: NO), control returns to step S807. That is, the control section 110 repeats the process of step S807 until the reception period ends.

At step S808, the control section 110 determines whether or not the processing of the ultrasonic sensor control device 100 has been finished. Specifically, the control section 110 determines whether or not processing for distance measurement in the ultrasonic sensor control device 100 has been finished. If the control section 110 determines at step S808 that the processing of the ultrasonic sensor control device 100 has been finished (step S808: YES), the processing of the ultrasonic sensor control device 100 ends. Meanwhile, if the control section 110 determines at step S808 that the processing of the ultrasonic sensor control device 100 has not been finished yet (step S808: NO), control returns to step S801, and the processes of steps S801 to S808 are repeated.

As described above, the device control section 113 of the ultrasonic sensor control device 100 according to the second embodiment changes the transmission frequency in such a manner that the transmission frequency is a frequency different from the first frequency during the third period after the end of the transmission period. Thus, the ultrasonic sensor control device 100 is able to more securely reduce the influence of the reverberations of the transmission ultrasonic wave transmitted from the transmission device 210.

In addition, as described above, the device control section 113 of the ultrasonic sensor control device 100 according to the second embodiment changes the reception frequency in such a manner that the reception frequency is the first frequency during the third period after the end of the transmission period. This makes it possible to securely receive a reflected wave while limiting influence of a direct wave and reverberations even in the case where the reflected wave arrives in a short time as in a distance measuring system for short-range distance measurement. Thus, a distance measuring system capable of more accurate distance measurement can be implemented by using the ultrasonic sensor 10 according to the second embodiment.

In the above-described second embodiment illustrated in FIG. 7, the transmission frequency is changed to the second frequency (45 kHz) at the time T2, and the reception frequency is the second frequency (45 kHz) until the time T2. Note, however, that this example configuration is not meant to limit embodiments of the present disclosure. For example, the transmission frequency may alternatively be changed to the third frequency (50 kHz) at the time T2. Also, the reception frequency may alternatively be the third frequency (50 kHz) until the time T2. Use of a plurality of frequencies as frequencies other than the distance-measuring frequency (i.e., the first frequency) contributes to more effectively limiting the influence of a direct wave and reverberations.

In addition, in the above-described second embodiment illustrated in FIG. 7, the voltage (Vc_rx) of the reception frequency adjustment section 240 is changed from the voltage (3 V) for the second frequency to the voltage (0 V) for the first frequency at the time T2. Note, however, that this example configuration is not meant to limit embodiments of the present disclosure. For example, the voltage (Vc_rx) of the reception frequency adjustment section 240 may be changed from the voltage (3 V) for the second frequency to the voltage (0 V) for the first frequency at the time T3. Changing the voltage of the reception frequency adjustment section 240 after a time taken to stabilize the transmission frequency elapses after the change of the transmission frequency at the time T2 contributes to reducing the influence of reverberations on the reception device 230. Also note that the change of the voltage in the reception frequency adjustment section 240 may be made not at the time T2 or the time T3 but at a time after the time T3, depending on the environment in which the ultrasonic sensor control device 100 is used, for example. For example, the configuration in which the change of the voltage of the reception frequency adjustment section 240 is made at the time T3 can be implemented by providing, between step S805 and step S806 in the flowchart illustrated in FIG. 8, a process for allowing a wait time to elapse. This wait time may be, for example, 100 μs, which corresponds to four cycles of 400 kHz. Also note that this wait time is not meant to limit embodiments of the present disclosure, and that a time shorter or longer than 100 μs may be set as the wait time. For example, a configuration that more effectively limits the influence of reverberations can thus be implemented for a distance measuring system for long-range distance measurement, in which a longer time is taken for a reflected wave to arrive.

Other Embodiments

Note that the above-described embodiments are merely example embodiments of the present disclosure. Accordingly, it should naturally be understood that embodiments of the present disclosure are not limited to the above-described embodiments, and that various modifications can be made to the above-described embodiments according to design requirements and other factors without departing from the scope of the technical idea of the present disclosure.

Also note that the scope of the embodiments of the present disclosure includes a computer program (i.e., an ultrasonic sensor control program) that causes a computer to perform the processes of the above-described ultrasonic sensor control device 100, and a computer-readable storage medium having the program stored therein. Here, the type of the above computer-readable storage medium is not limited to particular types. Also note that the above computer program may not necessarily be stored in the storage medium, but may be a computer program that is transferred via a telecommunication channel, a wireless or wired communication channel, or a network typified by the Internet, for example.

What is claimed is:

1. An ultrasonic sensor control device that controls an ultrasonic sensor device configured to transmit and receive ultrasonic waves, the ultrasonic sensor control device comprising:
a transmission control section configured to control transmission of a transmission ultrasonic wave at a first frequency through the ultrasonic sensor device;
a reception section configured to receive a reception ultrasonic wave through the ultrasonic sensor device; and
a device control section configured to control the ultrasonic sensor device to set given frequencies as a transmission frequency of the transmission ultrasonic wave and a reception frequency of the reception ultrasonic wave, wherein
the device control section changes the reception frequency in such a manner that the reception frequency is a frequency different from the first frequency during a first period including at least a transmission period during which the transmission ultrasonic wave is transmitted.

2. The ultrasonic sensor control device according to claim 1, wherein the first period includes the transmission period during which the transmission ultrasonic wave is transmitted and a second period after an end of the transmission period.

3. The ultrasonic sensor control device according to claim 2, wherein the second period is a given period after the end of the transmission period and until reverberations of the transmission ultrasonic wave are reduced in sound pressure to a given level or lower.

4. The ultrasonic sensor control device according to claim 1, wherein the device control section changes the transmission frequency in such a manner that the transmission frequency is a frequency different from the first frequency during a third period after the end of the transmission period.

5. The ultrasonic sensor control device according to claim 1, wherein
the ultrasonic sensor device includes a transmission device and a reception device each including a diaphragm, and
the device control section sets a frequency different from the first frequency as the transmission frequency and/or the reception frequency by changing a natural frequency of the diaphragm to an oscillation frequency that does not resonate with the first frequency.

6. An ultrasonic sensor comprising:
an ultrasonic sensor device that includes diaphragms and which transmits and receives ultrasonic waves through vibration of the diaphragms;
a transmission control section configured to control transmission of a transmission ultrasonic wave at a first frequency through the ultrasonic sensor device;
a reception section configured to receive a reception ultrasonic wave through the ultrasonic sensor device; and
a device control section configured to control the ultrasonic sensor device to set given frequencies as a transmission frequency of the transmission ultrasonic wave and a reception frequency of the reception ultrasonic wave, wherein
the device control section changes the reception frequency in such a manner that the reception frequency is a frequency different from the first frequency during a given period including at least a transmission period during which the transmission ultrasonic wave is transmitted.

* * * * *